US010233393B2

(12) United States Patent
Oluwaseun et al.

(10) Patent No.: US 10,233,393 B2
(45) Date of Patent: Mar. 19, 2019

(54) HEATED AIRLOCK FEEDER UNIT (71) Applicant: Golden Renewable Energy, Yonkers, NY (US)

(72) Inventors: Oluwadare Oluwaseun, Yonkers, NY (US); Anthony F. Tenore, Yonkers, NY (US); David Fowler, Yonkers, NY (US)

(73) Assignee: GOLDEN RENEWABLE ENERGY, LLC, Yonkers, NY (US)

( * ) Notice: Subject to any disclaimer, the term of this patent is extended or adjusted under 35 U.S.C. 154(b) by 0 days.

(21) Appl. No.: 15/062,319

(22) Filed: Jul. 8, 2016

(65) Prior Publication Data
US 2018/0010048 A1    Jan. 11, 2018

(51) Int. Cl.
*C10B 47/44* (2006.01)
*C10B 23/00* (2006.01)
(Continued)

(52) U.S. Cl.
CPC ............... *C10B 47/44* (2013.01); *C10B 23/00* (2013.01); *C10B 31/08* (2013.01); *C10B 53/07* (2013.01); *C10B 13/00* (2013.01)

(58) Field of Classification Search
CPC ......... C10B 31/08; C10B 23/00; C10B 53/07; C10B 47/44; C10B 13/00; B29C 47/40
See application file for complete search history.

(56) References Cited

U.S. PATENT DOCUMENTS 2,458,068 A    1/1949 Fuller
2,616,519 A    11/1952 Crankshaw et al.
(Continued)

FOREIGN PATENT DOCUMENTS

CN    105542830 A    5/2016
KR    20030051913    7/2003
(Continued)

OTHER PUBLICATIONS

International Search Report and Written Opinion received in corresponding PCT Application No. PCT/IB2017/053667 dated Sep. 12, 2017.
(Continued)

*Primary Examiner* — Renee Robinson
*Assistant Examiner* — Gabriel E Gitman
(74) *Attorney, Agent, or Firm* — Ajay A. Jagtiani; Miles & Stockbridge P.C.

(57) ABSTRACT

A Heated Airlock Feeder is disclosed. The Heated Airlock Feeder allows for the continuous feeding of solid, shredded plastic into a reactor tube surrounded by clamshell burner boxes. Inside of the reactor tube, two augers, one with right hand flights and one with left hand flights are welded to smooth augers to create two continuous augers that push solid plastic material, liquid plastic material and molten plastic material through two small holes. As the plastic is in its molten state while being forced through the two small holes, an airlock is formed preventing air form entering the system. As the solid, shredded plastic is fed into the system, an airlock is formed allowing for the continuous feeding of the system. The clamshell burner boxes allow for convection and radiant heat allowing for even, continuous heat.

21 Claims, 6 Drawing Sheets (51) Int. Cl.
*C10B 31/08* (2006.01)
*C10B 53/07* (2006.01)
*C10B 13/00* (2006.01)

(56) References Cited

U.S. PATENT DOCUMENTS

| | | | |
|---|---|---|---|
| 2,916,121 A * | 12/1959 | Vervest | F16D 43/20 |
| | | | 192/109 R |
| 3,129,459 A | 4/1964 | Kullgren et al. | |
| 3,151,784 A | 10/1964 | Tailor | |
| 3,797,702 A | 3/1974 | Robertson | |
| 3,822,866 A | 7/1974 | Daester et al. | |
| 3,907,259 A | 9/1975 | Leclercq | |
| 3,981,454 A | 9/1976 | Williams | |
| 4,025,058 A * | 5/1977 | Mizuguchi | B29B 7/482 |
| | | | 366/149 |
| 4,123,332 A * | 10/1978 | Rotter | C10B 7/10 |
| | | | 201/15 |
| 4,261,225 A | 4/1981 | Zahradnik | |
| 4,426,018 A | 1/1984 | Ward | |
| 4,437,046 A | 3/1984 | Faillace | |
| 4,473,478 A | 9/1984 | Chivrall | |
| 5,078,857 A * | 1/1992 | Melton | C10G 9/20 |
| | | | 122/355 |
| 5,129,995 A | 7/1992 | Agarwal | |
| 5,205,225 A * | 4/1993 | Milsap, III | B09C 1/06 |
| | | | 110/110 |
| 5,394,937 A | 3/1995 | Nieh | |
| 5,611,268 A | 3/1997 | Hamilton | |
| 5,720,232 A | 2/1998 | Meador | |
| 5,732,829 A | 3/1998 | Smith | |
| 5,756,871 A | 5/1998 | Wang | |
| 5,762,666 A | 6/1998 | Amrein et al. | |
| 6,109,902 A | 8/2000 | Goris et al. | |
| 6,126,907 A | 10/2000 | Wada | |
| 6,221,329 B1 | 4/2001 | Faulkner et al. | |
| 6,298,751 B1 * | 10/2001 | Ide | B29C 47/0801 |
| | | | 198/625 |
| 6,387,221 B1 | 5/2002 | Schoenhard | |
| 6,455,789 B1 | 9/2002 | Allison | |
| 6,634,508 B1 * | 10/2003 | Ishigaki | B01D 29/118 |
| | | | 210/415 |
| 6,758,150 B2 | 7/2004 | Ballantine et al. | |
| 7,301,060 B2 | 11/2007 | Appel et al. | |
| 7,311,509 B2 | 12/2007 | Lupke | |
| 7,476,296 B2 | 1/2009 | Appel et al. | |
| 7,692,050 B2 | 4/2010 | Adams et al. | |
| 7,771,699 B2 | 8/2010 | Adams et al. | |
| 7,906,695 B2 | 3/2011 | Giercke | |
| 8,003,833 B2 | 8/2011 | Appel et al. | |
| 8,200,238 B2 | 6/2012 | Gildea | |
| 8,304,590 B2 * | 11/2012 | Hopkins | C10B 47/44 |
| | | | 201/25 |
| 8,372,248 B1 | 2/2013 | Sherry | |
| 8,518,218 B2 | 8/2013 | Ali et al. | |
| 8,548,501 B2 | 10/2013 | Gildea | |
| 8,574,325 B2 * | 11/2013 | Jensen | C10J 3/18 |
| | | | 422/129 |
| 8,801,904 B2 | 8/2014 | Miller et al. | |
| 8,809,606 B2 | 8/2014 | Appel et al. | |
| 8,877,992 B2 | 11/2014 | Appel et al. | |
| 9,045,693 B2 * | 6/2015 | Wolfe | C10J 3/007 |
| 9,220,798 B2 | 12/2015 | McKee et al. | |
| 9,275,655 B2 | 3/2016 | Wilson et al. | |
| 9,624,439 B2 | 4/2017 | Bakaya et al. | |
| 9,630,345 B2 * | 4/2017 | Alsewailem | B29B 7/428 |
| 9,795,940 B2 | 10/2017 | Miller et al. | |
| 9,868,597 B2 | 1/2018 | Henry et al. | |
| 2002/0048523 A1 | 4/2002 | Achtelik et al. | |
| 2003/0047437 A1 | 3/2003 | Stankevitch | |
| 2004/0003481 A1 | 1/2004 | Tarrant | |
| 2004/0144698 A1 | 7/2004 | Hilpert et al. | |
| 2006/0211899 A1 | 9/2006 | Lee | |
| 2007/0179326 A1 | 8/2007 | Baker | |
| 2008/0105141 A1 | 5/2008 | Duperon | |
| 2008/0128259 A1 | 6/2008 | Kostek et al. | |
| 2008/0202983 A1 | 8/2008 | Smith | |
| 2008/0286557 A1 | 11/2008 | Tucker | |
| 2010/0008836 A1 | 1/2010 | Pecci | |
| 2010/0024696 A1 | 2/2010 | Cauley et al. | |
| 2010/0200229 A1 | 8/2010 | Jefferd | |
| 2011/0290057 A1 * | 12/2011 | Corcoran | F16H 25/20 |
| | | | 74/473.12 |
| 2012/0024106 A1 | 2/2012 | Brotzki | |
| 2012/0024687 A1 | 2/2012 | Bratina et al. | |
| 2012/0261247 A1 | 10/2012 | McNamara et al. | |
| 2013/0299333 A1 | 11/2013 | Tucker et al. | |
| 2014/0054815 A1 | 2/2014 | Houk et al. | |
| 2014/0121426 A1 | 5/2014 | Tandon | |
| 2015/0023826 A1 | 1/2015 | Desiron | |
| 2015/0053542 A1 * | 2/2015 | Liang | B02C 17/20 |
| | | | 201/7 |
| 2015/0064297 A1 | 3/2015 | Yang | |
| 2015/0080624 A1 | 3/2015 | Gephart et al. | |
| 2017/0036378 A1 | 2/2017 | Yanev et al. | |
| 2017/0218278 A1 | 8/2017 | Bakaya et al. | |
| 2017/0283707 A1 | 10/2017 | Gephart et al. | |
| 2017/0361329 A1 | 12/2017 | Behrens et al. | |
| 2017/0361558 A1 | 12/2017 | Tenore et al. | |
| 2018/0056262 A1 | 3/2018 | Miller et al. | |

FOREIGN PATENT DOCUMENTS

| | | | |
|---|---|---|---|
| KR | 10-0686370 | 2/2007 | |
| KR | 100686370 B1 | 2/2007 | |
| KR | 1020090117377 A | 11/2009 | |
| WO | WO01/05910 A1 * | 1/2001 | C10J 3/18 |
| WO | WO0105910 A1 * | 1/2001 | C10J 3/18 |
| WO | 2008017953 A2 | 2/2008 | |
| WO | 2009129233 A2 | 10/2009 | |

OTHER PUBLICATIONS

Search Report and Written Opinion received in PCT Application No. PCT/IB2017/053713 dated Sep. 20, 2017.
Search Report and Written Opinion received in PCT Application No. PCT/IB2017/053714 dated Sep. 20, 2017.
Search Report and Written Opinion received in PCT Application No. PCT/IB2017/052811 dated Aug. 7, 2017.
Search Report and Written Opinion received in PCT Application No. PCT/IB2017/053667 dated Sep. 12, 2017.
Search Report and Written Opinion received in PCT Application No. PCT/IB2017/054058 dated Nov. 9, 2017.
Office Action received in U.S. Appl. No. 15/641,471 dated Feb. 12, 2018.
U.S. Office Action dated May 3, 2018 in U.S. Appl. No. 15/062,319.
U.S. Office Action dated Jun. 6, 2018 in U.S. Appl. No. 15/641,471.

* cited by examiner

HEATED AIRLOCK FEEDER UNIT

REFERENCE TO RELATED APPLICATIONS

This application discloses material that is related to material disclosed in a provisional application filed on Dec. 9, 2014, and having Ser. No. 62/089,617, titled "Feeding Reactor/Extruder", incorporated herein in its entirety by reference.

BACKGROUND OF THE INVENTION

(a) Field of the Invention

The present invention improves on extruder technology as it allows for the continuous feeding of the reactor while using much less power, thus increasing efficiency and lowering the cost of production for the fuel product. This application relates to an apparatus that is part of a re-useable fuel processing unit. This apparatus allows for the continuous feeding of plastic into the unit since the apparatus described herein creates a process by which heat is tolerated in an anaerobic environment, atmospheric pressure does not leak in and out of the apparatus, air does not leak into the apparatus, and plastic in solid and heated liquid form does not cause problems within the apparatus downstream from the feeder.

(b) Discussion of Known Art

The use of feeder airlock systems in re-useable energy apparatus is known. Examples of known devices include U.S. Pat. No. 5,762,666 to Amrein et. al, U.S. Pat. No. 3,151,784 to Tailor, and U.S. Pat. No. 3,129,459 to Kullgren et. al. These patents teach airlocks with side gates (Amrein et. al.), a rotary feeder to an airlock using vanes (Tailor), and an extruder using electric heat (induction) (Kullgren). The Tailor device teaches a rotary style apparatus in which steel vanes are mounted to a shaft and spin inside a machined round housing. An opening is in the top and bottom of the housing to allow material to flow in and out of the housing. The vanes block the difference pressures between the inlet and outlet. There are four limitations with this design. The first is that it will not tolerate heat as it will expand and allow the pressures to leak. The second is that the vanes act as pockets and also carry the atmosphere from the inlet to the outlet. The third concerns the rotation velocity. The rotation velocity must be slow to allow time for the material to fall out of the discharge or material will be carried back around and prevent refill from the inlet. The forth is that this device will not allow for a molten material like hot plastic.

The Amrein device teaches a feeder airlock system using two valves, with a hopper or pipe between them to allow material fill. Although this design tolerates heat, it allows the atmosphere to enter the feeder from the inlet and pass through to the discharge. This is a limitation as atmospheric gases may not be allowed in some processes as they will cause problems downstream. A second limitation with this device is that it will not allow for a molten material like hot plastic.

The Kullgren device teaches an induction heated extruder. This extruder employs induction heating with the use of electric coils. Limitations with this apparatus are that it does not create an airlock so it does not allow for the continuous feeding of plastic material and it requires a thick long barrel that requires very high horsepower to achieve the internal pressure and heat necessary to melt the plastic, translating into a high power requirement.

SUMMARY

Plastic waste material is shredded and fed into a pyrolysis reactor. Applying heat above 350 degrees Celsius will cause the shredded plastic material to melt and vaporize. The Heated Airlock System is the apparatus in which the shredded plastic material is fed into the pyrolysis reactor. The main components of the heated airlock feeder system are the drive, coupling, gearbox, augers, housing, burner boxes, expansion cart, and support frame. It has been discovered that the prior art did not allow for the continuous feeding of heated plastic into the feeder while maintaining an air lock. Preferred examples of the disclosed invention include:

Existing gear boxes, designed as short as possible to reduce material and labor on fabrication, have limited function with this utility patent application, as the short gear boxes are limited on taking a cantilever load as the force of trying to hold a long heave shaft puts extreme pressure on the leading bearing resulting is reduction of the life of the bearing or requiring a heavy duty bearing to handle the force. If a heavy duty bearing is used, this results in a larger bearing creating large pockets in the gear box housing. The larger pocket reduces the ability of the housing to support the bearing, so in turn the housing will be made thicker. This increases the cost of a standard gear box. This design extends the space between the bearings and reduces load on the bearings. By spacing the bearings further apart, the cantilever load is reduced, the bearing size can be smaller and the housing can be thinner, reducing the overall cost and improving the performance. The further apart the points on connection on the bearings, the straighter the alignment on the shafts, reducing wear and increasing the life of the gear box;

A flat bar attached between the cart and the frame that allows for the apparatus to expand and contract due to heat transfer as this apparatus incorporates thinner material in the reactor allowing for better heat transfer;

Two heater zones, allowing plastic material to be transformed from a solid and shredded state to a liquid state; the solid and shredded plastic material at the start of the feeder and the liquid state at the end of the feeder. Between the shredded solid state and the liquid state exists plastic material in a molten state. The molten plastic material is thick and sticky and allows for the formation of the required pressure to create the airlock necessary to keep air from entering the reactor; and, The use of vapor gas (natural gas or syn-gas) and clamshell burners allowing for the external heat to be allowed in the processing of the plastic material whereas prior art used electric heater bands and internal pressure, resulting in high power consumption, to produce the heat required to process the plastic material. The use of vapor gas and clamshell burners allows for less power consumption, faster processing time, and more accurate and consistent heat production.

The use of clamshell burners allows heat to be generated over the entire exterior surface of the penetrating pipe and allowing for access to the reactor tube. The use of the clamshell burners allows for a low profile to the interior reactor reducing the amount of space between the heat source and the penetrating pipe surface, increasing the heat transfer without increasing the BTU value required by a burner system. The clamshell design combines both convection heat and radiant heat producing an even heat source around the penetrating pipe. The combining of the two types of heat is accomplished with the use of a perforated screen running the entire length of the penetrating tube and one third of the way up on the bottom inside of the clamshell burners. This design also prevents hotspots that normally occur in burner boxes. Another difference in this system compared to existing systems is that the igniting source is inside the clamshell burner box next to the perforated screen. The system contains flame sensors as well as a fan pressure switch to ensure airflow. Dual gas streams are used by adjusting the gas quantity or the air quantity, whereas existing systems use complicated air control dampers to adjust the air and gas ratio, that may cause uneven burning of the fuel creating irregular flame size. The clamshell design that is part of the Heated Airlock Feeder is not lined with refractory on all surfaces, but only on the top half of the clamshell. The fact that the lower half of the clamshell is not lined with refractory allows any heat build-up to dissipate through the entire box surface. This design also reduces the chance of auto-ignition of the mixed gas.

It should be noted and understood that while the above and other advantages and results of the present invention will become apparent to those skilled in the art from the following detailed description and accompanying drawings, showing the contemplated novel construction, combinations, and elements herein described, and more particularly defined by the appended claims, it should be clearly understood that changes in the precise embodiments of the herein described invention are meant to be included within the scope of the claims, except insofar as they may be precluded by the prior art.

BRIEF DESCRIPTION OF THE DRAWINGS

The accompanying drawings illustrate preferred embodiments of the present invention according to the best mode presently devised for making and using the instant invention, and in which:

FIG. 1 depicts the entire re-useable energy apparatus which the Heated Airlock Feeder is a part of.

DETAILED DESCRIPTION OF PREFERRED EXEMPLAR EMBODIMENTS

While the invention will be described and disclosed herein connection with certain preferred embodiments, the description is not intended to limit the invention to the specific embodiments shown and described here, but rather the invention is intended to cover all alternative embodiments and modifications that fall within the spirit and scope of the invention as defined by claims included herein as well as any equivalents of the disclosed and claimed invention.

The utility patent this application describes allows the application of back pressure to the feed material between the cold material and the heated, melting material (molten plastic). The main components of the Heated Airlock Feeder system are the drive, coupling, gearbox, augers, housing, clamshell burner boxes, expansion cart, and support frame.

Figure 1:
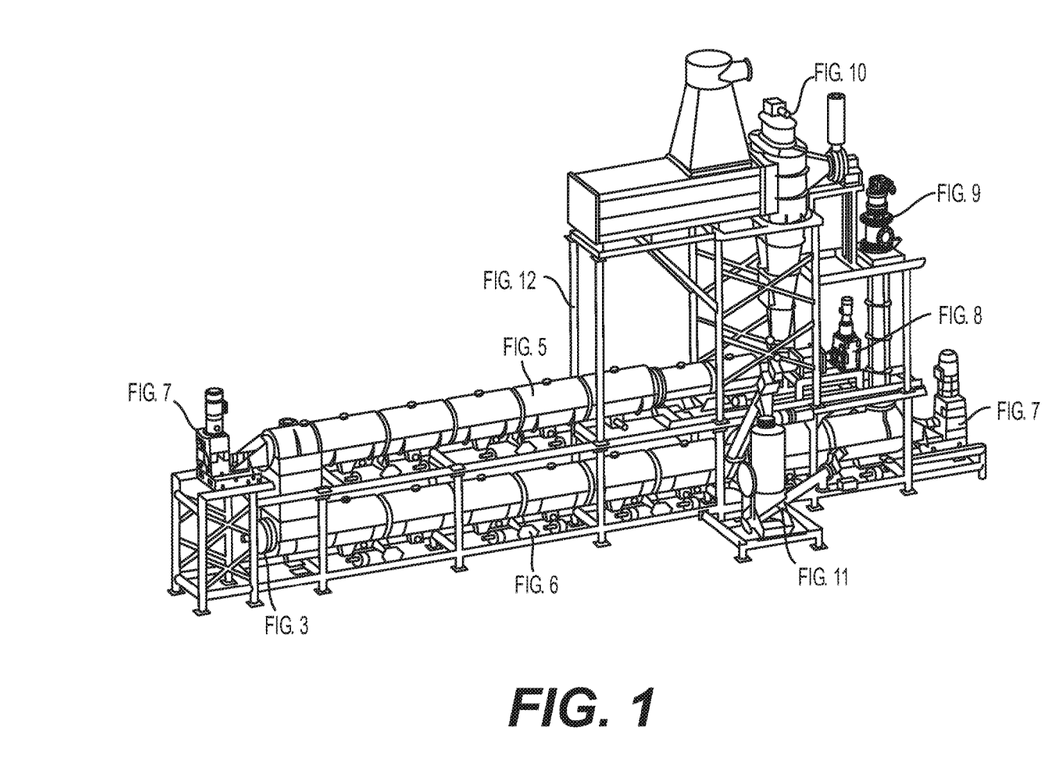
Figure 2:
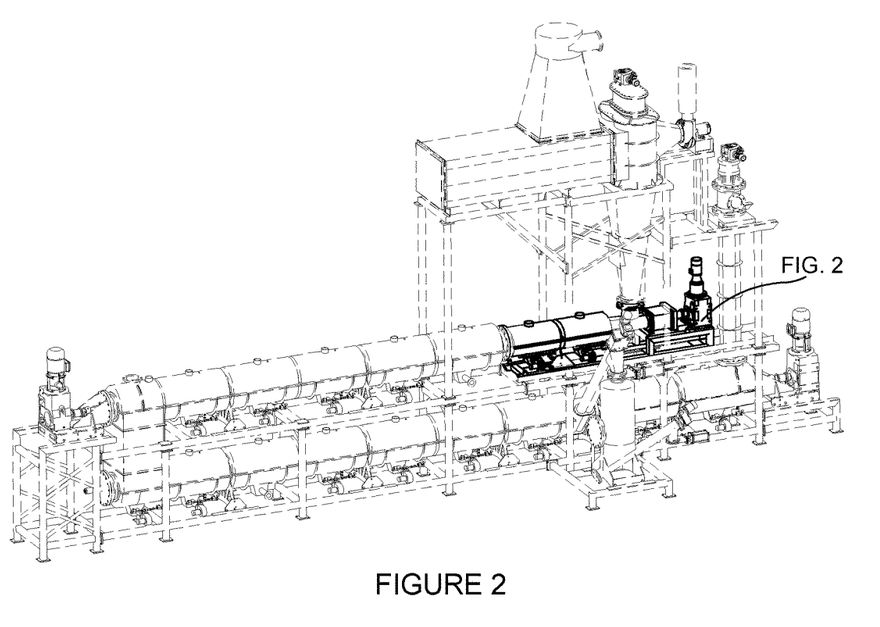
FIG. 2 depicts the shaded Heated Airlock Feeder with the remaining part of the re-useable energy apparatus faded.
Figure 3:
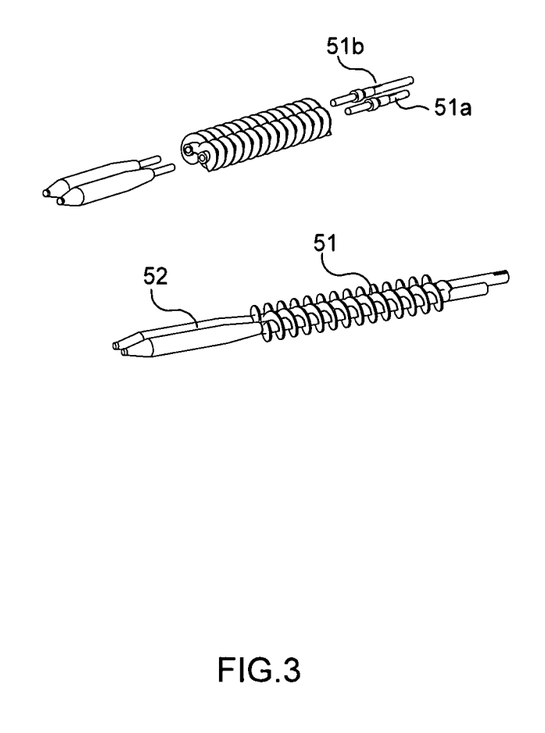
FIG. 3 depicts the augers that are in Heated Airlock Feeder that are also depicted in FIG. 4 at 51.

FIG. 1 depicts the entire assembly of the re-usable energy reactor system. FIG. 2 depicts the Heated Airlock Feeder that is part of the entire assembly of the re-useable energy reactor system. The drive system is a standard off-the-shelf helical gear drive with a high torque ratio FIG. 4 at 59. The gear drive is selected with the vertical footprint to reduce the system's overall length FIG. 4 at 59. This drive is connected to a standard shear coupling. This coupling is design to separate under overloading conditions to protect the gearbox. The coupling consists of two augers. The two augers FIG. 4 at 51 are custom constructed. These augers are also depicted in FIG. 3. These augers are a machined three-part system. The first part of the augers are the drive shafts depicted in FIG. 3 at 51*a* and 51*b*, one drive shaft being longer than the second drive shaft. These are elongated and axially rotatable. The middle section of the augers are elongated, axially rotatable screws each having an elongated shaft with outwardly extending helical flighting along the one-half of the length of each shaft starting at the gear box and connecting to a axially rotating smooth surface auger where the smooth part of each auger at the output side of the apparatus are machined so that the space between each auger and the elongated tubular barrel housing is less than 1 inch at contactors 52 of FIG. 3.

Figure 4:
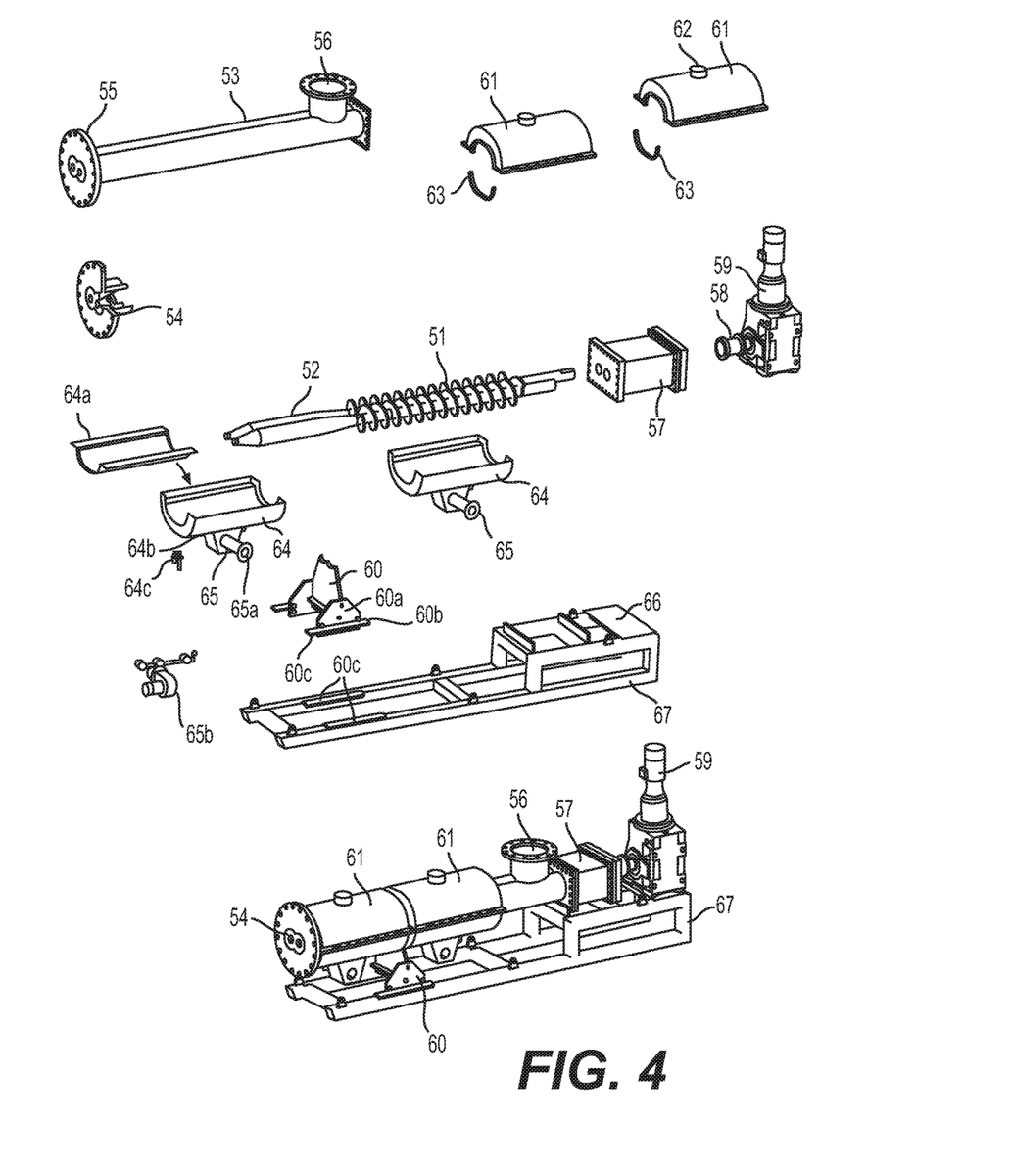
FIG. 4 depicts the Heated Airlock Feeder in its completed form and broken down by its parts.

These augers are located inside FIG. 4 at 53 which is inside FIG. 4 at 61. One auger has left-hand flights, the other auger has right hand flights that overlap the left hand flights. One of the augers FIG. 4 at 51 is longer than the other to protrude through the gearbox and connect to the drive coupling located in the gear box FIG. 4 at 57. The augers are constructed from solid materials with connection slips for machining purposes. The augers are constructed in segments to reduce the material and labor cost to fabricate the assembly. The segments are also interchangeable for simpler fabrication. The gear drives in the gearbox 57 are keyed into the shaft and sealed on both sides. The gearbox consists of double lip seals, bearings and spur gears. The length of the gearbox is extended to carry the cantilever load of the screw flights FIG. 4 at 51 and 52.

All surfaces are machined on the contacting side of both items FIG. 4 at 51 and 52 after welding. The housing FIG. 4 at 53 is pre-welded before machining the interior to require a straight design. The connecting flanges at both ends and the inlet match the gearbox and the reactor bolt pattern. Nozzle 54 of FIG. 4 is machine tapered to reduce the outlet area to increase back pressure inside the Heated Airlock Feeder (FIG. 4). This feeder assembly is welded to a reactor matching flange FIG. 4 at 55 and then welded to the body of FIG. 4 at 53. FIG. 4 at 52 is welded to FIG. 4 at 51 and then this entire assembly slides through the body of FIG. 4 at 53 and protrudes flush to the end of FIG. 4 at 54, the outlet ports. The gearbox and the assembly housing rest on the support frame FIG. 4 at 67. This assembly is bolted in the back is the main anchor point for the entire reactor. As the heated airlock feeder expands due to the heat it expands lengthwise. To address the expansion, this apparatus is supported with a cart FIG. 4 at 60 to allow the machine to expand, without creating stress on the supports. Existing art used shorter sections that are bolted together and constructed from a very thick material to absorb the heat. This design used a thinner material for better heat transfer but requires a moveable support system.

The solid, shredded plastic material (environmental temperature) is fed into the Heated Airlock Feeder at 56 on FIG. 4, the heat is applied at 61 on FIG. 4, and the heated plastic material which is in a molten state is created from the solid shredded plastic material (environmental temperature) at where 51 connects to 52 in FIGS. 4. 51 and 52, a continuous auger is located inside 53 which is located inside 61. The airlock is created at the end of 52 in FIG. 4 from the back pressure from the solid, shredded plastic material (environmental temperature) pushing on it.

This apparatus is used to induce heated plastic material into the main reactor and act as an airlock at the same time. By applying back pressure on the fed plastic material, between the solid, shredded plastic material and melting material (molten plastic material), a dead spot depicted on FIG. 4 at 52 is created. At 52 there are no flights on the shaft. This dead spot created by this process, depicted on FIG. 4 at 52, allows molten plastic material to build up pressure by the incoming solid, shredded plastic material (environmental temperature) being fed into the apparatus at 56 on FIG. 4. This area 52 also has a larger shaft area, which fills the void between 52 and 53. This larger shaft increases the pressure inside creating an airlock effect. The discharge of the airlock feeder is also restricted at 54 on FIG. 4 by the two openings that are greatly reduced in size compared to the opening where the solid, shredded plastic material (environmental temperature) is fed at 56 on FIG. 4. When the feeder is shut down, the plastic material remains inside the feeder in area at 52 on FIG. 4 because even as the feeder augers at 51 on FIG. 4 continue to rotate, the plastic material will not be pushed out from the housing at 53 on FIG. 4. The reason for this is because the heated molten plastic material is only pushed out when new solid, shredded plastic material (environmental temperature) is introduced. The incoming plastic material creates pressure and forces the molten plastic material in area 52 to be displaced. This means that when the airlock feeder cools off, the remaining plastic material will turn to a solid and seal until the next run. When the next run occurs, this plastic material will melt when reheated and allow the augers at 51 on FIG. 4 to rotate.

This apparatus also heats the plastic material to a vapor and liquid state with a clamshell burner at 61 on FIG. 4. The heating source for this airlock feeder are two clamshell heaters FIG. 4 at 61 through 65. These two clamshell heater boxes produce the heat needed to make the airlock seal and start the vaporization of the plastic inside the feeder. The plastic material is heated from the discharge end to mid-way of the airlock feeder. By having two heater zones, the material is transformed from a liquid state on one end, to the shredded state on the other. Between this transition exists a molten plastic material. This molten plastic is thick and sticky and forms the needed pressure to create an airlock affect. These clamshell boxes come in contact with the airlock feeder with the seal FIG. 4 at 63. This allows for greater expansion of the housing FIG. 4 at 53 from the clamshell fire boxes because of boxes are insulated on the inside, not allowing the metal to expand as on the outside. The Heated Airlock Feeder has two clamshell box burners. One box covers FIG. 4 at 52 of the internal auger, and the other heats the auger at 51 of the auger. The advantage of two clamshell heater box burners is demonstrated on startup and shutdown of the reactor. Allowing the auger FIG. 4 at 51 to cool to a point that a plastic seals is achieved to create the airlock needed for start-up and shut down. The molten plastic cools into a solid around the auger and the housing, sealing off the feeder. The ability to cool rapidly is also a big advantage of using clamshell heaters. The burners' flame can be extinguished and the fans may continue to run to cool the housing FIG. 4 at 53.

The clamshell burner boxes are used as the heated airlock feeder requires a continuous even supply of heat to produce molten plastic. The correct amount of controlled heat is vital to the process for consistent material flow. Processes of this nature require heat from all directions. The need for a high velocity airflow in a circular box would suffice for this process. Heater boxes with process structures penetrating through the box will also require a seal system to prevent leaks. Expansion of the penetrating structure in both length and diameter was considered in this design. The ability to both heat and cool are required in this process. The penetrating structure needs support capability to prevent damage to the heater box seals. The penetrating structure (pipe or tube) would need to be supported outside the heater boxes. Due to heat expansion on the penetrating structure a mobile support is required. The requirement for controlling the expansion direction is also needed to prevent warpage of the penetrating structure and deflection that would damage the heater box seals requiring a controlled support system to restrict deflection in the direction that might damage the equipment.

Furnace heater boxes are used in many processes to produce heat required for incinerating, cooking, melting, and for other heat required processes. When a cylinder or tube penetrates a heater box, problems with uneven heating, seal leakage and expansion may occur. Because of the need to access the penetrating tube, a pipe is required. A clamshell design was implemented for these reasons. The clamshell design allowed for a circular shape to match the profile of the penetrating pipe or tube. This close profile along with high velocity airflow ensures even heating around the penetrating pipe. The clamshell design has a very low profile interior to reduce the amount of space between the heat source and the penetrating pipe surface, increasing the heat transfer without increasing the BTU value required by a burner system. Compared to a standard burner box where a burner is attached on one side of the box at a distance not allowing an open flame to come into contact with the penetrating pipe, this design uses very small flame points to distribute the heat one third of the way around the penetrating pipe. This reduces the total BTU value. This design combines both types of heat, convection and radiant, producing an even heat source around the penetrating pipe. A perforated screen FIG. 4 at 64a was used that distributes the gas fuel and controls the flame height while allowing airflow through the heater box. A standard off-the-shelf burner package can be used to supply both the gas and air mixture for igniting. The difference in this system is the igniting source is inside clamshell burner box next to the perforated screen. A flame sensor is used to ensure ignition and a fan pressure switch is used to ensure airflow. Dual gases can be used by adjusting the gas quantity or the air quantity. Existing systems use complicated air control dampers to adjust the air to gas ratio, causing uneven burning of the fuel creating irregular flame size. The air velocity and pressure must be at a fixed rate to insure the mix gas exits the perforated holes as needed as not to allow for the mix gas to ignite under the perforated screen. This design overcomes this problem by stopping the gas flow and allowing the air to continue when the temperature is over a given set-point. When the system cools to a low set-point gases are allowed back into the mix and reignited. This control is achieved with a standard PIO controller with thermocouples to indicate internal temperatures. The clamshell design allows for access to the refractory liner that is installed only on the top half of the clamshell. All known heater boxes are normally lined with refractory liners on all surfaces. The lower half of this clamshell has no refractory liner, allowing any heat buildup to dissipate through the box surface and it ensures that the surface temperature remains below the auto ignite point. The perforated screen acts as a pressure regulator between the mixed gas and the flame above. This chamber is being fed with ambient air and mixed gas, both at ambient temperature. This keeps the lower half of the clamshell cooler. Without refractory on the lower clamshell, refractory replacement is not needed. The radiant heat from the flame is not in contact with the bottom portion of the penetrating tube FIG. 4 at 53. The airflow from the burner forces air around the penetrating to carrying heat completely around the penetrating to because of natural disturbance. The movement of this air regulates the radiant heat surface of the penetrating tube by pulling excessive heat into the airstream forcing the air around the penetrating tube through an exhaust port. The perforated screen has small flames running the entire length and one third around the penetrating tube. This prevents hotspots that normally occur in burner boxes. By heating the penetrating tube in all directions expansion occurs in all directions. To prevent deflection or misalignment of the penetrating tube while being heated, the expansion direction is controlled with a support system. The support attaches to the expansion tube and prevents movement from unwanted directions. The cart consists of cam followers that are pinched between two structural flat bars, one on each side of the cart. The cart width is designed so that it is within one-eighth of an inch in between the width of the two structural flat bars so that it drops between the structural flat bars and ensures lateral movement. The cam followers (rollers) support the weight of the penetrating tube while preventing it from expanding up or down. This allows for the control of expansion direct action is in a lateral movement only. Typical pipe support rollers allow expansion in multiple directions. This design restricts expansion to lateral movement only keeping the penetrating tube from misaligning. The assembly is mounted on a steel skid mount frame FIG. 4 at 67. The clamshell heater boxes consist of an upper FIG. 4 at 61 and lower FIG. 4 at 64 section. These sections are connected with a matching bolted flange and a seal chamber, FIG. 4 at 63 that encompasses the penetrating tube. The gas air inlet box is mounted on the bottom section FIG. 4 at 64 to allow air gas mix into the lower section. The lower section has a perforated metal screen FIG. 4 at 64*a* welded 3 inches above the lower section FIG. 4 at 64. This acts as an air chamber to distribute mixed air and gas through the perforated screen. The amount and diameter of the holes in the perforated screen are vital to control the flame height while allowing the volume of gas and air mix to pass through. The lower clamshell FIG. 4 at 64 also has an air mixture box FIG. 4 at 65 and the burner connection port FIG. 4 at 65*a* connected to it. The air mixer box FIG. 4 at 65 has a flared configuration to distribute the air gas mix evenly under the perforated screen FIG. 4 at 64*a*. The air mixer box FIG. 4 at 65 creates some back pressure to the air gas mixture which ensures a consistent gas air ratio for each opening in the perforated screen FIG. 4 at 64*a*. A standard off-the-shelf burner can be connected to the port FIG. 4 at 65*a*. The standard burner igniter, along with the flame indicator, is located to the top of the perforated screen FIG. 4 at 64*a*. An access pipe FIG. 4 at 64*b* is used to penetrate through both the lower clamshell FIG. 4 at 64 and the perforated screen FIG. 4 at 64*a*, for an igniter and for the flame sensor FIG. 4 at 64*c* to be mounted. A continuous pilot light FIG. 4 at 64*c* is installed through this pipe and stops above the perforated screen FIG. 4 at 64*a*. The pilot light proof of flame is required to indicate a flame is present until gas is allowed into the air gas mixture. When the heat set point is reached the gas alone, from the air gas mixture, ceases while the fan continues to run and push fresh air through the burner box. The pilot light continues to run in this phase of the heating process. Control of the heat is used with a PID controller. This controller is fed by thermocouples located on the top clamshell FIG. 4 at 61. A wide range of temperatures can be achieved and controlled with this type of process. The ability to switch between fuel gases is also possible with this design. Two sets of solenoid valves located on the burner FIG. 4 at 65*b* and have adjustable orifices to allow a fixed amount of gas to enter into a consistent amount of air. Natural gas mixed with air requires a different air mix ratio then syn-gas would require with the same air volume. Adjustment of the fixed orifices allow for switching between the gases. The expansion of the penetrating tube FIG. 4 at 53 is controlled by the cart support FIG. 4 at 60. This cart consists of heavy metal plate construction, resting between two flat bar retainers FIG. 4 at 60*b* that are welded to a frame FIG. 4 at 67. This allows the cam followers to roll on a smooth surface, preventing up and down movement. The cart width is only 118" less than the space between the flat bars FIG. 4 at 60*c*, preventing side to side movement and up and down movement while allowing left to right movement only.

By preheating and vaporizing the plastic biomass material under positive pressure and high heat, the main reactor depicted in FIG. 1 is shortened by about 40 feet to acquire the same performance as a standard reactor section would do. This reduces the reactor (FIG. 1) expansion length along with the auger FIG. 4. This reduction in size increases the torque in this area as the auger is shorter. The auger on the upper reactor depicted in FIG. 1 at 1 is where the most torque is required due to the large amount of liquid plastic contained within the reactor. The further the plastic travels down the reactor depicted in FIG. 1, the more plastic material is converted to vapor and the less the auger has to work.

Figure 5:
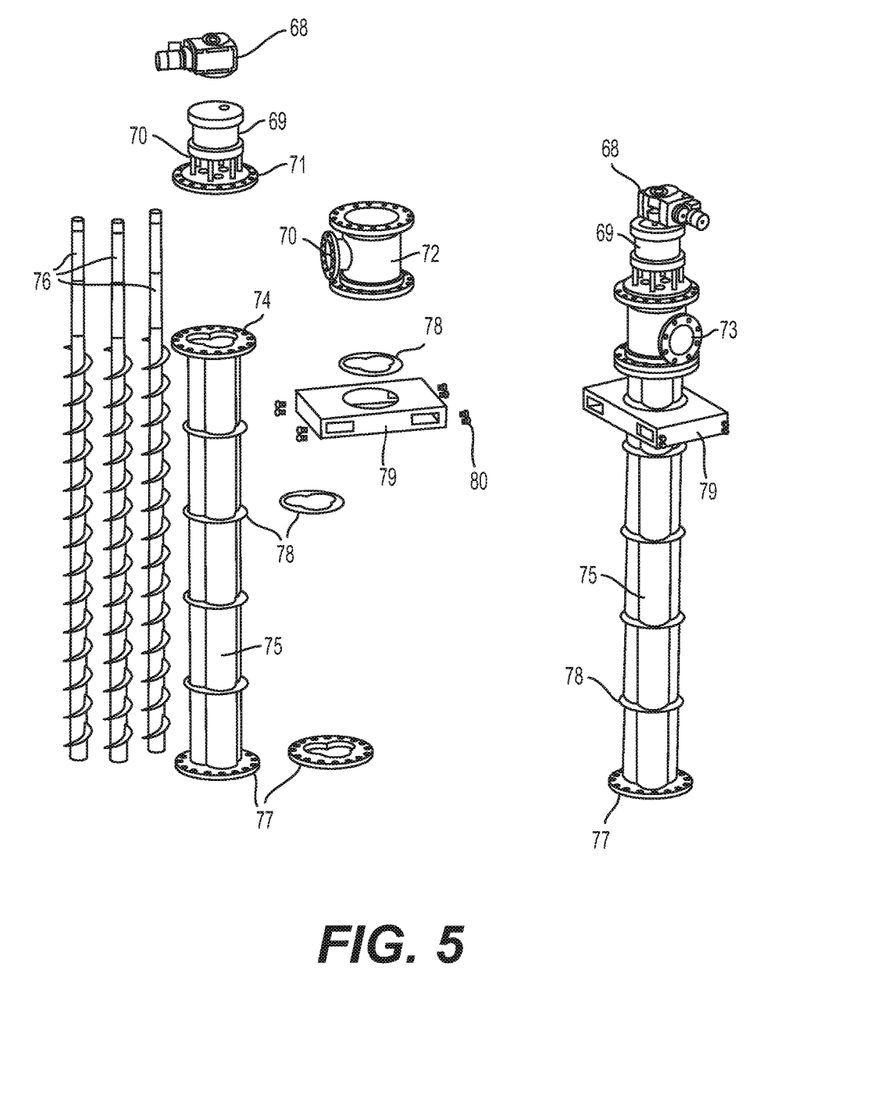
FIG. 5 depicts the Char Separating Column in its completed form and broken down by its parts.
Figure 6:
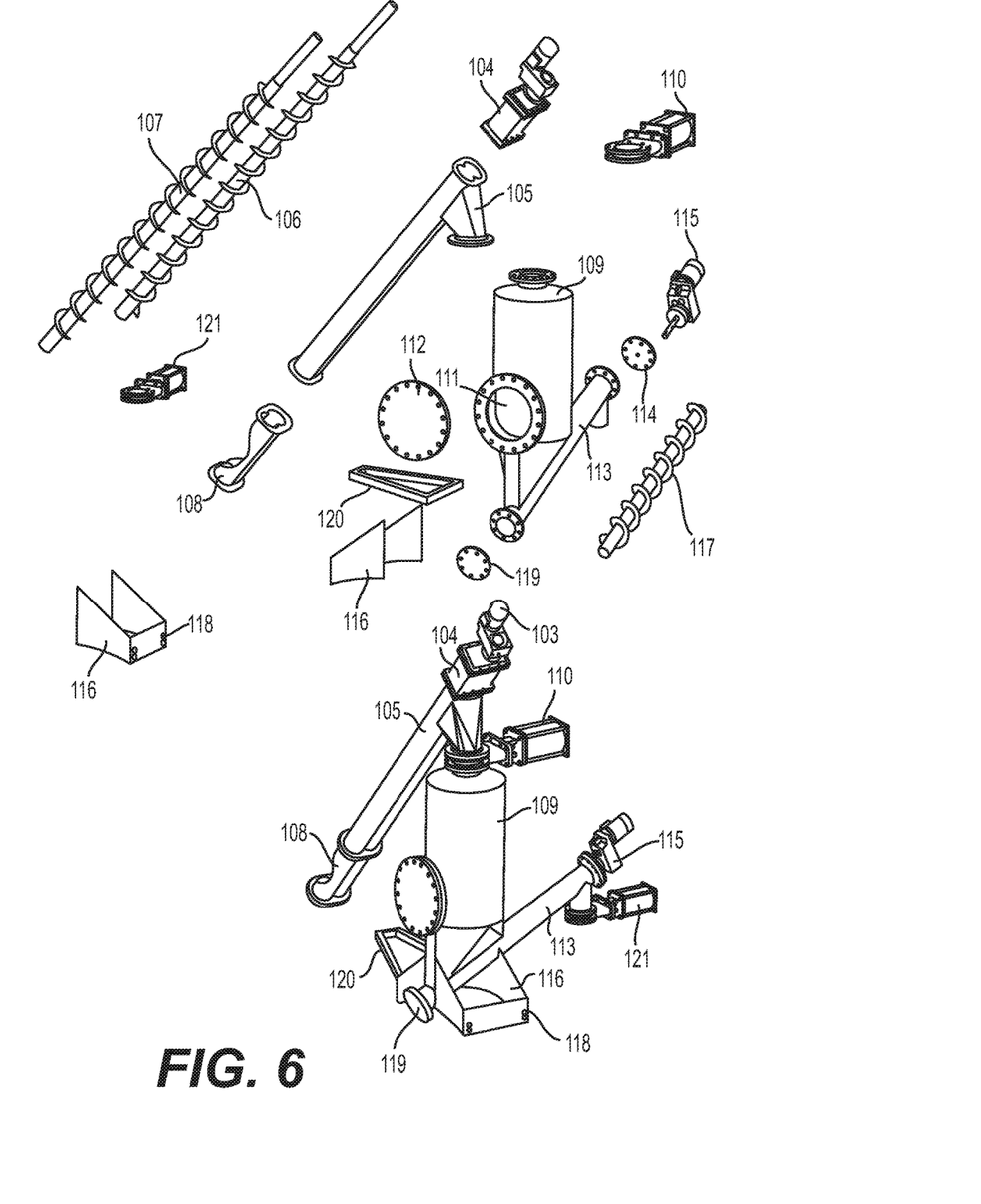
FIG. 6 depicts the Char Discharge System in its completed form and broken down by its parts.

The burner boxes depicted in FIG. 4 at 61 are in two section. This allows for controlled heat zones. This control is needed to maintain the airlock effect during startup and shut down of the reactor. As the reactor heats up, it will start to build pressure inside. This pressure will look for a way out of the reactor. First is the heated reactor feeder that is the apparatus that is the subject of this patent application depicted in FIG. 4 and the second and third areas where the pressure may leave the system is at the ash discharge depicted in FIG. 6 and at the and the ash separator depicted in FIG. 5. The char discharge in FIG. 6 is a seal with slide gates preventing vapor loss. The char separator depicted in FIG. 5 allows the vapors to be removed.

This design is modular construction for quick shop assembly and quick installation. This also allows for easy maintenance in the field. The modular design can be completely assembled and tested in the shop.

While the invention above has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention claimed, except as precluded by prior art.

What is claimed is:

1. An apparatus that is part of a reusable fuel processing unit of a main reactor comprising:
   a drive system;
   a coupling;
   a gear box;
   augers;

an elongated tubular barrel housing; and a plurality of split assembly clamshell heater boxes,
wherein, the drive system comprises a gear drive,
wherein, the gear drive is arranged with a vertical footprint to reduce the overall length of the main reactor,
wherein the gear drive is connected to the coupling,
wherein, the coupling is designed to separate under overloading conditions to protect the gear box,
wherein, the coupling consists of two augers, one having left-hand flights, the other having right-hand flights, the two augers comprising drive shafts, where one of the drive shafts of the two augers is longer than the other and is configured to extend into the gear box and connect to a drive coupling to provide rotation,
wherein, the gear box is extended to accommodate a cantilever load of the two augers,
wherein, the elongated tubular barrel housing is configured having one side that is tapered to reduce an outlet area to increase back pressure inside a heated airlock feeder,
wherein, the two augers are located within the elongated tubular barrel housing,
wherein, an assembly of the two augers and the elongated tubular barrel housing is surrounded by the plurality of split assembly clamshell heater boxes,
wherein, the two augers are elongated, axially rotatable screws each having an elongated shaft with outwardly extending helical flighting along one-half of a length of each elongated shaft starting at the gear box and ending in a smooth surface where the smooth surface has the same diameter as the augers with the outwardly extending helical flighting,
wherein, the flightings of the two augers overlap to provide rotation of the outwardly extending helical flighting in opposite directions.

2. The apparatus of claim 1, wherein, smooth parts of each auger at an output side of the apparatus are machined so that a space between each auger and the elongated tubular barrel housing is less than 1 inch.

3. The apparatus of claim 1, wherein the elongated tubular barrel housing is connected to a feeder assembly.

4. The apparatus of claim 1, wherein each clamshell heater box comprises upper and lower sections.

5. The apparatus of claim 4, wherein the upper and lower sections are circular through 180 degrees.

6. The apparatus of claim 4, wherein each lower section includes a perforated screen.

7. The apparatus of claim 6, wherein the perforated screen is mounted approximately three inches above the lower section.

8. The apparatus of claim 6, comprising an ignition source disposed inside each clamshell heater box next to the perforated screen.

9. The apparatus of claim 6, wherein the perforated screen is configured to control a flame height while allowing a volume of gas and air mix to pass there through.

10. The apparatus of claim 6, wherein the perforated screen is metal.

11. The apparatus of claim 6, wherein each lower section comprises an air mixer box including a burner connection port.

12. The apparatus of claim 11, comprising a flame sensor.

13. The apparatus of claim 11, comprising a fan pressure switch.

14. The apparatus of claim 1, wherein the apparatus is connected to an expansion cart for allowing the apparatus to expand and contract.

15. The apparatus of claim 14, wherein the expansion cart is configured to rest on a support frame of the apparatus.

16. The apparatus of claim 15, wherein the expansion cart comprises metal plate construction and rests between retainers connected to the support frame, the expansion cart being configured to roll on a surface of the support frame, thereby preventing up and down movement.

17. The apparatus of claim 1, wherein the gear drive is a helical gear drive.

18. The apparatus of claim 1, wherein the coupling is a shear coupling.

19. The apparatus of claim 1, wherein the gear box comprises gear drives configured to drive the two augers.

20. The apparatus of claim 19, wherein the gear drives of the gear box comprise spur gears.

21. An apparatus that is part of a reusable fuel processing unit having an assembly being used to introduce plastic into a main reactor and act as an airlock at the same time allowing for continuous feeding of plastic into the main reactor, comprising:

a drive system;
a coupling;
a gear box;
augers;
an elongated tubular barrel housing; and
split assembly clamshell heater boxes,
wherein, the drive system comprises a gear drive,
wherein, the gear drive is arranged with a vertical footprint to reduce the overall length of the main reactor,
wherein the gear drive is connected to the coupling,
wherein, the coupling is designed to separate under overloading conditions to protect the gear box,
wherein, the coupling consists of two augers, one having left-hand flights, the other having right-hand flights, the two augers comprising drive shafts, where one of the drive shafts of the two augers is longer than the other and is configured to extend into the gear box and connect to a drive coupling to provide rotation,
wherein, the gear box is extended to accommodate a cantilever load of the two augers,
wherein, one side of the elongated tubular barrel housing is tapered to reduce an outlet area to increase back pressure inside a heated airlock feeder,
wherein, the two augers are located within the elongated tubular barrel housing,
wherein, the assembly of the two augers and the elongated tubular barrel housing is surrounded by two split assembly clamshell heater boxes, one covering one end of the two augers and the other covering the other end of the two augers, that produce heat that allows the airlock to seal and start vaporization of plastic inside the heated airlock feeder, the split assembly clamshell heater boxes coming into contact with the heated airlock feeder allowing for greater expansion of a housing from the split assembly clamshell heater boxes due to that they are insulated on the inside so metal does not expand on the outside,
wherein, the two augers are elongated, axially rotatable screws each having an elongated shaft with outwardly extending helical flighting along one-half of the length of each elongated shaft starting at the gear box and ending in a smooth surface where the smooth surface has the same diameter as the augers with the outwardly extending helical flighting, wherein, the flightings of the two augers overlap to provide rotation of the outwardly extending helical flighting in opposite directions.

\* \* \* \* \*